US012532070B2

(12) United States Patent
Sugimoto et al.

(10) Patent No.: US 12,532,070 B2
(45) Date of Patent: Jan. 20, 2026

(54) CONTROL APPARATUS, CONTROL METHOD, AND PROGRAM

(71) Applicant: FUJIFILM Corporation, Tokyo (JP)

(72) Inventors: Masahiko Sugimoto, Saitama (JP); Tomoharu Shimada, Saitama (JP); Tetsuya Fujikawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/473,302

(22) Filed: Sep. 25, 2023

(65) Prior Publication Data

US 2024/0015398 A1    Jan. 11, 2024

Related U.S. Application Data

(63) Continuation of application No. PCT/JP2022/000996, filed on Jan. 13, 2022.

(30) Foreign Application Priority Data

Mar. 30, 2021    (JP) ................................. 2021-056871

(51) Int. Cl.
*H04N 23/667* (2023.01)
*H04N 7/18* (2006.01)
(Continued)

(52) U.S. Cl.
CPC ........... *H04N 23/667* (2023.01); *H04N 7/183* (2013.01); *H04N 23/69* (2023.01); *H04N 23/695* (2023.01)

(58) Field of Classification Search
CPC .... H04N 23/667; H04N 23/69; H04N 23/695; H04N 7/18; H04N 7/183
See application file for complete search history.

(56) References Cited

U.S. PATENT DOCUMENTS

2002/0140814 A1* 10/2002 Cohen-Solal ......... G01S 3/7865
348/172
2004/0119819 A1   6/2004 Aggarwal et al.
(Continued)

FOREIGN PATENT DOCUMENTS

JP    H11250369    9/1999
JP    2002300572    10/2002
(Continued)

OTHER PUBLICATIONS

Arai, Atsushi et al., "Estimation of Skilled Camera Operators' Camerawork in Live Soccer Games", IEICE Technical Report, Feb. 2020, submit with English abstract, pp. 23-28.
(Continued)

*Primary Examiner* — Kathleen V Nguyen
(74) *Attorney, Agent, or Firm* — JCIPRNET

(57) ABSTRACT

A control apparatus is a control apparatus including a processor that controls a surveillance camera that surveils a surveillance region. The processor allows switching an operation mode of the surveillance camera between a first surveillance mode in which a target object present in the surveillance region is detected and tracked, and a second surveillance mode in which the target object is imaged according to a manual operation performed with respect to the surveillance camera, divides the surveillance region into a first region and a second region, and switches the operation mode from the first surveillance mode to the second surveillance mode according to a fact that the target object tracked in the first surveillance mode in the first region enters the second region.

5 Claims, 14 Drawing Sheets

(51) Int. Cl.
    *H04N 23/69*     (2023.01)
    *H04N 23/695*     (2023.01)

(56) References Cited

U.S. PATENT DOCUMENTS

| | | | |
|---|---|---|---|
| 2010/0013917 A1 | 1/2010 | Hanna et al. | |
| 2017/0104938 A1* | 4/2017 | Shimosato | H04N 23/61 |
| 2017/0134698 A1* | 5/2017 | Mahar | G08B 13/19667 |
| 2021/0400196 A1* | 12/2021 | Suzuki | H04N 23/66 |

FOREIGN PATENT DOCUMENTS

| | | | |
|---|---|---|---|
| JP | 2004056473 | | 2/2004 |
| JP | 2004519955 | | 7/2004 |
| JP | 2004309246 | | 11/2004 |
| JP | 2006229321 | | 8/2006 |
| JP | 2006523043 | | 10/2006 |
| JP | 2008199389 | | 8/2008 |
| JP | 2018146874 | * | 9/2018 |
| JP | 2020170320 | | 10/2020 |
| KR | 20150080440 | * | 7/2015 |

OTHER PUBLICATIONS

"International Search Report (Form PCT/ISA/210) of PCT/JP2022/000996," mailed on Apr. 5, 2022, with English translation thereof, pp. 1-7.

"Written Opinion of the International Searching Authority (Form PCT/ISA/237) of PCT/JP2022/000996," mailed on Apr. 5, 2022, with English translation thereof, pp. 1-10.

"Notice of Reasons for Refusal of Japan Counterpart Application", issued on May 13, 2025, with English translation thereof, p. 1-p. 8.

* cited by examiner

CONTROL APPARATUS, CONTROL METHOD, AND PROGRAM

CROSS-REFERENCE TO RELATED APPLICATION

This application is a continuation application of International Application No. PCT/JP2022/000996, filed Jan. 13, 2022, the disclosure of which is incorporated herein by reference in its entirety. Further, this application claims priority from Japanese Patent Application No. 2021-056871 filed on Mar. 30, 2021, the disclosure of which is incorporated herein by reference in its entirety.

BACKGROUND

1. Technical Field

The technology of the present disclosure relates to a control apparatus, a control method, and a program.

2. Description of the Related Art

JP2006-523043A describes that a method of detecting a moving object and controlling a surveillance system includes a processing module adapted to receive image information from at least one image forming sensor. The surveillance system executes a movement detection analysis on a captured image and controls a camera in a specific method in a case in which the moving object is detected.

JP1999-250369A (JP-H11-250369A) describes a mobile fire surveillance apparatus including a surveillance camera that images a predetermined area, a surveillance side control device that is installed in relation to the surveillance camera and processes surveillance relation information, and an operation side control device that communicates with the surveillance side control device and processes the surveillance relation information.

JP2004-056473A describes that a surveillance control apparatus is provided with a neural network (NW) that outputs recognition information corresponding to an image captured by a camera based on a learning result, a control unit that performs control based on the recognition information, a short-term storage unit that transitorily stores image data, and a storage unit that records the image data, the NW learns a relationship between the image and a degree of urgency of an event represented by the image and recognizes the degree of urgency corresponding to the image captured by the camera, and the control unit controls a frame rate of the image data recorded in the storage unit based on the recognition information of the NW.

SUMMARY

One embodiment according to the technology of the present disclosure provides a control apparatus, a control method, and a program which can reduce a burden on a user for surveillance of a target object.

The present disclosure relates to a control apparatus comprising a processor that controls a surveillance camera that surveils a surveillance region, in which the processor allows switching an operation mode of the surveillance camera between a first surveillance mode in which a target object present in the surveillance region is detected and tracked, and a second surveillance mode in which the target object is imaged according to a manual operation performed with respect to the surveillance camera, divides the surveillance region into a first region and a second region, and switches the operation mode from the first surveillance mode to the second surveillance mode according to a fact that the target object tracked in the first surveillance mode in the first region enters the second region.

It is preferable that, in the first surveillance mode, the processor images the surveillance region by causing the surveillance camera to perform a pan and a tilt to change an imaging range.

It is preferable that the processor causes the surveillance camera to perform a zoom to change a region including the target object according to a fact that the target object tracked in the first surveillance mode in the first region enters the second region.

It is preferable that, in the second surveillance mode, the processor causes the surveillance camera to perform at least any one of a pan, a tilt, or the zoom according to the manual operation.

It is preferable that, in the second surveillance mode, the processor outputs an image captured by the surveillance camera after the manual operation as teacher data by machine learning.

It is preferable that, in the second surveillance mode, the processor outputs a history of the manual operation as teacher data by machine learning.

It is preferable that the second surveillance mode is a mode in which the target object is imaged according to the manual operation performed with respect to the surveillance camera, in addition to the first surveillance mode.

It is preferable that, in the second surveillance mode, the processor detects an object that appears in an image captured by the surveillance camera after the manual operation, and tracks the detected object by causing the surveillance camera to perform at least any one of a pan, a tilt, or a zoom.

It is preferable that the processor switches the operation mode from the second surveillance mode to the first surveillance mode according to a fact that the target object exits the second region.

It is preferable that, in the first surveillance mode, the processor detects the target object by using a trained model that has been trained through machine learning.

The present disclosure relates to a control method of controlling a surveillance camera that surveils a surveillance region, the method comprising allowing switching an operation mode of the surveillance camera between a first surveillance mode in which a target object present in the surveillance region is detected and tracked, and a second surveillance mode in which the target object is imaged according to a manual operation performed with respect to the surveillance camera, dividing the surveillance region into a first region and a second region, and switching the operation mode from the first surveillance mode to the second surveillance mode according to a fact that the target object tracked in the first surveillance mode in the first region enters the second region.

The present disclosure relates to a program for causing a computer to execute a process comprising allowing switching an operation mode of a surveillance camera between a first surveillance mode in which a target object present in a surveillance region is detected and tracked, and a second surveillance mode in which the target object is imaged according to a manual operation performed with respect to the surveillance camera, dividing the surveillance region into a first region and a second region, and switching the operation mode from the first surveillance mode to the second surveillance mode according to a fact that the target object tracked in the first surveillance mode in the first region enters the second region.

BRIEF DESCRIPTION OF THE DRAWINGS

Exemplary embodiments according to the technique of the present disclosure will be described in detail based on the following figures, wherein.

DETAILED DESCRIPTION

Hereinafter, examples of a control apparatus, a control method, and a program according to the technology of the present disclosure will be described with reference to the accompanying drawings.

First, the terms used in the following description will be described.

CPU refers to an abbreviation of "Central Processing Unit". NVM refers to an abbreviation of "Non-volatile memory". RAM refers to an abbreviation of "Random Access Memory". IC refers to an abbreviation of "Integrated Circuit". ASIC refers to an abbreviation of "Application Specific Integrated Circuit". PLD refers to an abbreviation of "Programmable Logic Device". FPGA refers to an abbreviation of "Field-Programmable Gate Array". SoC refers to an abbreviation of "System-on-a-chip". SSD refers to an abbreviation of "Solid State Drive". USB refers to an abbreviation of "Universal Serial Bus". HDD refers to an abbreviation of "Hard Disk Drive". EEPROM refers to an abbreviation of "Electrically Erasable and Programmable Read Only Memory". EL refers to an abbreviation of "Electro-Luminescence". I/F refers to an abbreviation of "Interface". CMOS refers to an abbreviation of "Complementary Metal Oxide Semiconductor". CCD refers to an abbreviation of "Charge Coupled Device".

SWIR refers to an abbreviation of "Short Wave Infra-Red". LAN refers to an abbreviation of "Local Area Network".

Figure 1:
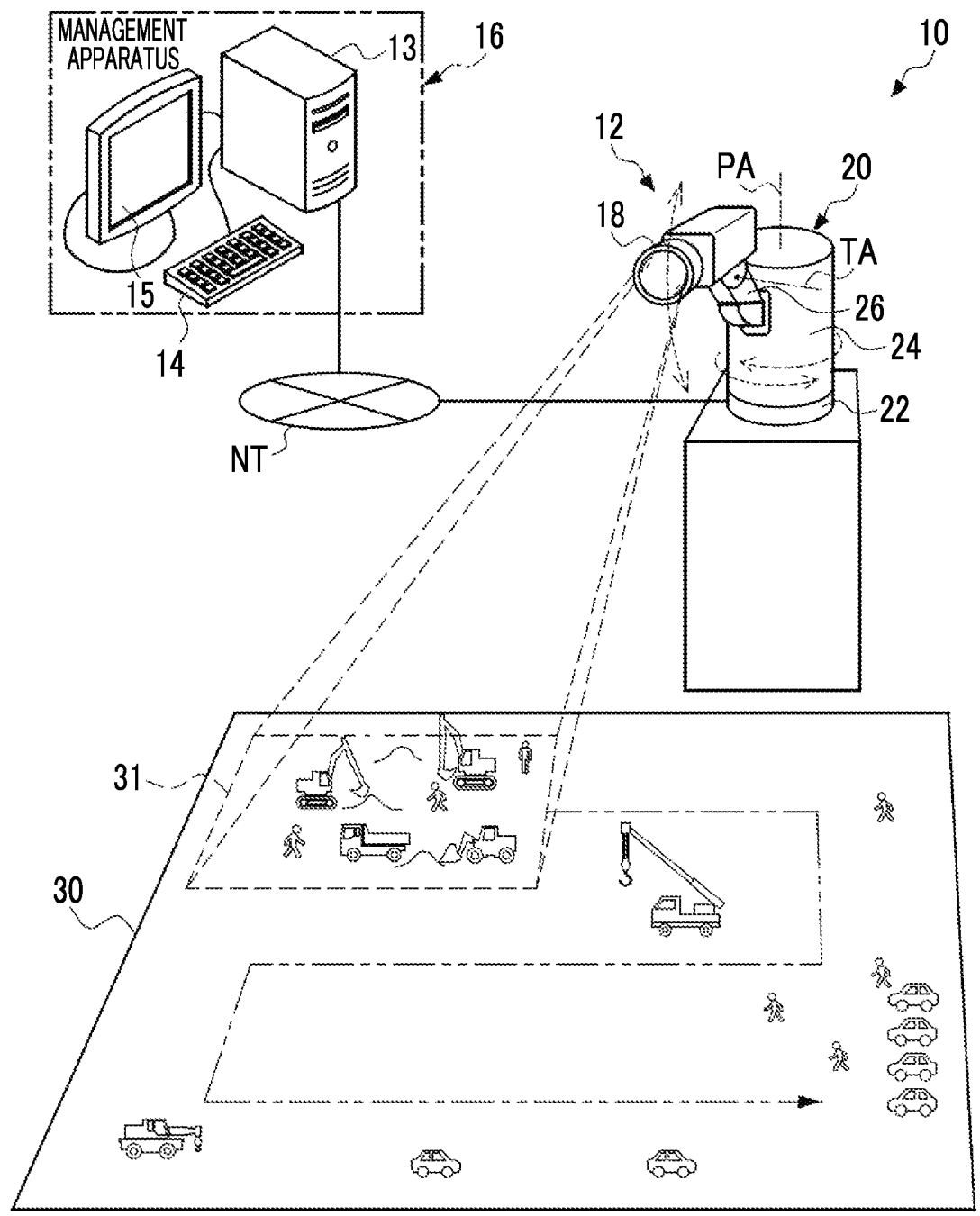
FIG. 1 is a schematic configuration diagram showing an example of a configuration of an entire surveillance system.

As an example, as shown in FIG. 1, a surveillance system 10 comprises a surveillance camera 12 and a management apparatus 16. The surveillance system 10 is, for example, a system that surveils a construction site. The surveillance camera 12 is installed at a high place, such as a roof of a building in the vicinity of the construction site.

The management apparatus 16 is used by, for example, a user, such as a site supervisor who supervises a worker at the construction site. The user surveils, for example, whether or not a danger occurs in the construction site during the work by using the management apparatus 16. In particular, the user surveils the movement of a dangerous object, such as a heavy machine, by using the management apparatus 16. The surveillance system 10 is a system for reducing a surveillance burden on the user. It should be noted that the dangerous object is an example of a "target object" according to the technology of the present disclosure.

The surveillance camera 12 comprises an imaging apparatus 18 and a revolution apparatus 20. The imaging apparatus 18 images a subject by receiving, for example, light in a visible wavelength range reflected by the subject. It should be noted that the imaging apparatus 18 may image the subject by receiving near-infrared light, which is light in a short-wave infrared wavelength range reflected by the subject. The short-wave infrared wavelength range refers to, for example, a wavelength range of about 900 nm to 2500 nm. Light in the short-wave infrared wavelength range is also generally referred to as SWIR light.

The imaging apparatus 18 is attached to the revolution apparatus 20. The revolution apparatus 20 revolves the imaging apparatus 18. For example, the revolution apparatus 20 changes an imaging direction of the imaging apparatus 18 to a pan direction and a tilt direction. The pan direction is, for example, a horizontal direction. The tilt direction is, for example, a vertical direction.

The revolution apparatus 20 comprises a substrate 22, a pan rotating member 24, and a tilt rotating member 26. The pan rotating member 24 is formed in a columnar shape, and is attached to an upper surface of the substrate 22. The tilt rotating member 26 is formed in an arm shape, and is attached to an outer peripheral surface of the pan rotating member 24. The imaging apparatus 18 is attached to the tilt rotating member 26. The tilt rotating member 26 rotates about a tilt axis TA parallel to the horizontal direction to change the imaging direction of the imaging apparatus 18 to the tilt direction.

The substrate 22 supports the pan rotating member 24 from below. The pan rotating member 24 rotates about a pan axis PA parallel to the vertical direction to change the imaging direction of the imaging apparatus 18 in the pan direction.

A driving source (for example, a pan motor 24A and a tilt motor 26A shown in FIG. 3) is built in the substrate 22. The driving source of the substrate 22 is mechanically connected to the pan motor 24A and the tilt motor 26A. For example, the driving source of the substrate 22 is connected to the pan rotating member 24 and the tilt rotating member 26 via a power transmission mechanism (not shown). The pan rotating member 24 rotates about the pan axis PA by receiving power from the driving source of the substrate 22, and the tilt rotating member 26 rotates about the tilt axis TA by receiving power from the driving source of the substrate 22.

As shown in FIG. 1, the surveillance system 10 generates a captured image by imaging an imaging range 31 set in a surveillance region 30 using the imaging apparatus 18. The surveillance system 10 images the entire surveillance region 30 by performing the pan and the tilt and changing the imaging range 31. Various subjects, such as heavy machines and workers, are present at the construction site as the surveillance region 30. The heavy machines include a crane truck, a power shovel, a road roller, a bulldozer, a dump truck, and the like.

The imaging apparatus 18 is, for example, a digital camera having an image sensor (not shown). The image sensor receives subject light indicating the subject, performs photoelectric conversion of the received subject light, and outputs an electric signal having a signal level corresponding to the received light amount as image data. The image data output by the image sensor corresponds to the captured image described above. The image sensor is a CMOS type image sensor, a CCD type image sensor, or the like. The imaging apparatus 18 may capture a color image, or may capture a monochrome image. Also, the captured image may be a still image, or may be a moving image.

In addition, the imaging apparatus 18 is provided with a zoom function. The zoom function is a function of reducing or enlarging (that is, zooming in or zooming out) the imaging range 31. The zoom function provided in the imaging apparatus 18 is an optical zoom function by moving a zoom lens, or an electronic zoom function by performing image processing with respect to the image data. It should be noted that the zoom function provided in the imaging apparatus 18 may be a system in which the optical zoom function and the electronic zoom function are combined.

The management apparatus 16 comprises a management apparatus body 13, a reception device 14, and a display 15. The management apparatus body 13 includes a built-in computer 40 (see FIG. 3), and controls the entire surveillance system 10. The reception device 14 and the display 15 are connected to the management apparatus body 13.

The reception device 14 receives various instructions from the user who uses the surveillance system 10. Examples of the reception device 14 include a keyboard, a mouse, and/or a touch panel. The management apparatus body 13 grasps various instructions received by the reception device 14. The display 15 displays various types of information (for example, an image and a text) under the control of the management apparatus body 13. Examples of the display 15 include a liquid crystal display or an EL display.

The surveillance camera 12 is communicably connected to the management apparatus 16 via a communication network NT (the Internet, a LAN, or the like), and operates under the control of the management apparatus body 13. The connection system between the surveillance camera 12 and the management apparatus 16 may be a wired connection system, or may be a wireless connection system.

The management apparatus 16 acquires the captured image output from the imaging apparatus 18 of the surveillance camera 12, and detects the dangerous object (the heavy machine, a suspended load, or the like) that appears in the captured image by using a trained model that has been trained through machine learning. In a case in which the specific object is detected, the management apparatus 16 causes the surveillance camera 12 to perform the pan, the tilt, and the zoom to track the detected object. Hereinafter, an operation of changing the imaging range 31 by the pan, the tilt, and the zoom is referred to as "PTZ". Further, an operation of changing the imaging range 31 according to a detection result of the object that appears in the captured image is referred to as "automatic PTZ".

In addition, the management apparatus 16 enables an operation of changing the imaging range 31 according to an operation of the reception device 14 by the user. Hereinafter, the operation of changing the imaging range 31 according to an instruction given to the reception device 14 is referred to as "manual PTZ". In the manual PTZ, the user can set the imaging range 31 to any position and size in the surveillance region 30 by operating the reception device 14.

In addition, hereinafter, an operation mode in which the target object that is present in the surveillance region 30 is detected and tracked by the automatic PTZ is referred to as an "automatic surveillance mode". In addition to the automatic surveillance mode, an imaging mode in which the target object is imaged according to the manual operation performed with respect to the surveillance camera 12 is effective is referred to as a "manual surveillance mode". That is, in the "manual surveillance mode" is, for example, an imaging mode in which the target object is imaged according to the manual operation in addition to continuing the tracking of the target object detected and tracked in the "automatic surveillance mode" (continuously executing the "automatic surveillance mode").

The user can perform a switching operation of switching the surveillance mode by the surveillance system 10 between the automatic surveillance mode and the manual surveillance mode. It should be noted that the automatic surveillance mode is an example of a "first surveillance mode" according to the technology of the present disclosure. The manual surveillance mode is an example of a "second surveillance mode" according to the technology of the present disclosure. It should be noted that, in the "manual surveillance mode", which is an example of the "second surveillance mode", it may be possible to disable a function of the "automatic surveillance mode", that is, a function of tracking the target object detected in the automatic surveillance mode according to an instruction of the user via the reception device 14 (that is, not to execute the automatic surveillance mode).

Figure 2:
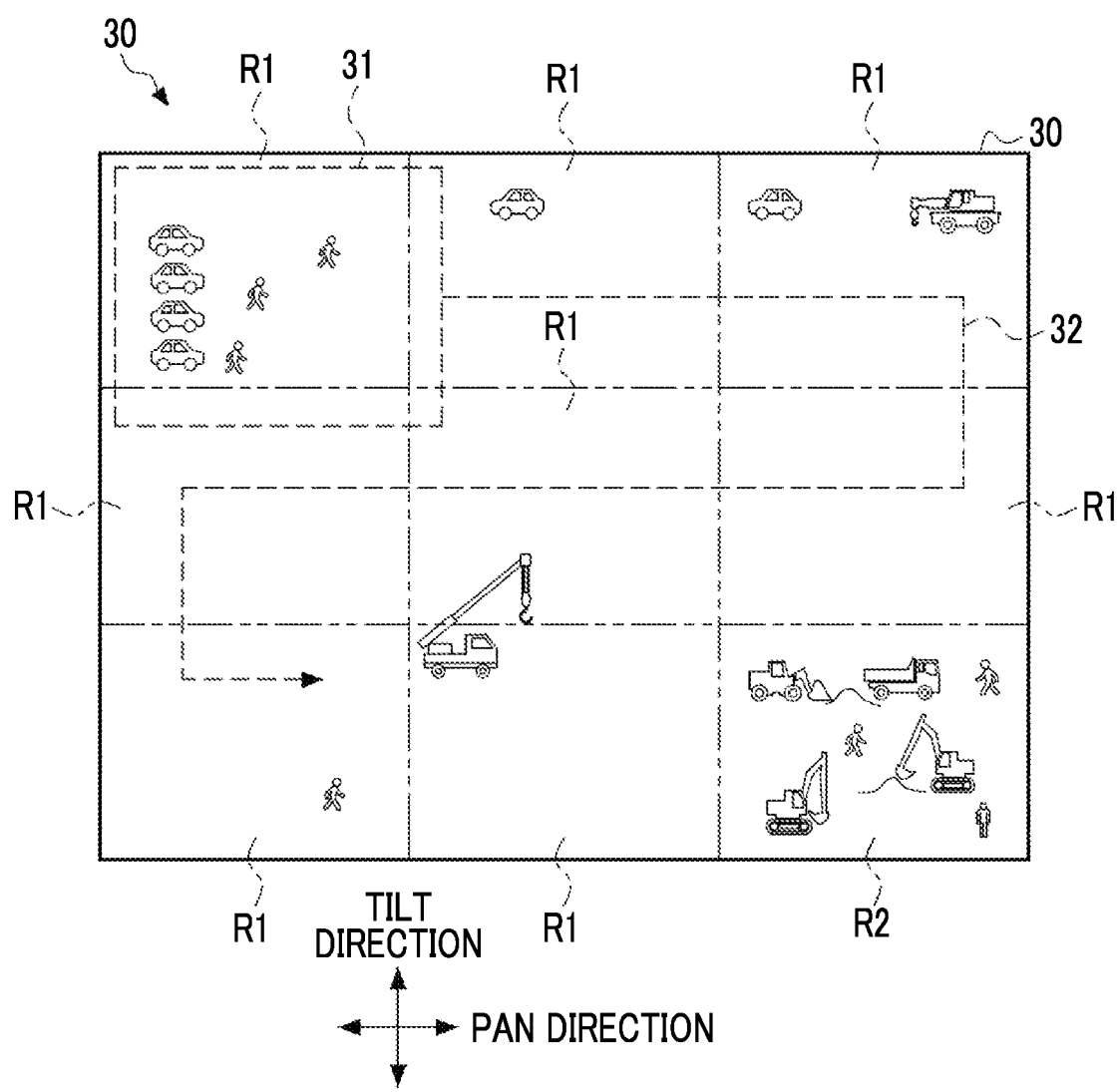
FIG. 2 is a conceptual diagram for describing division of a surveillance region.

The management apparatus 16 divides the surveillance region 30 into a plurality of areas, and surveils the movement of the dangerous object or the like. As shown in FIG. 2 as an example, the management apparatus 16 divides the surveillance region 30 into six areas, one of the six areas is designated as an area of interest R2, and the remaining five areas are designated as general areas R1. The area of interest R2 is an area in which construction work is performed and a degree of risk is high. In the example shown in FIG. 2, the area of interest R2 is a region in which a plurality of dangerous objects (heavy machine and the like) are gathered and perform the work. It should be noted that the general area R1 is an example of a "first region" according to the technology of the present disclosure. The area of interest R2 is an example of a "second region" according to the technology of the present disclosure.

Area information RI (see FIGS. 3 and 4) representing the general area R1 and the area of interest R2 in the surveillance region 30 are set in advance. For example, the management apparatus 16 sets, in the surveillance region 30, an area in which the work using the heavy machine is decided to be performed, as the area of interest R2. The management apparatus 16 manages the position coordinates of the general area R1 and the area of interest R2 in association with the amounts of the pan and the tilt of the surveillance camera 12. As a result, the management apparatus 16 can grasp whether the imaging range 31 imaged by the surveillance camera 12 corresponds to the general area R1 or the area of interest R2.

It should be noted that the area information RI may be information that is dynamically changed, instead of the information that is set in advance. For example, in the surveillance region 30, an area in which the movement of the heavy machine or the worker is large may be set as the area of interest R2. For example, in the surveillance region 30, a movement vector is obtained for each position in the captured image output from the imaging apparatus 18 of the surveillance camera 12, and sets an area in which the movement amount is large as the area of interest R2. In this case, the surveillance region 30 changes the area of interest R2 in a case in which the area in which the movement amount is large is changed.

It should be noted that a shape of each of the general area R1 and the area of interest R2 is not limited to a rectangular shape. In a case in which the area of interest R2 is set based on the movement vector, the shape of the area of interest R2 may be dynamically changed according to the shape of the area in which the movement amount is large.

The management apparatus 16 surveils the entire surveillance region 30 by causing the surveillance camera 12 to perform the pan and the tilt in the surveillance region 30 to change a position of the imaging range 31 along, for example, a route 32 shown in FIG. 2. In the example shown in FIG. 2, a size of the imaging range 31 in a case of surveilling the entire surveillance region 30 is larger than a size of the area of interest R2, but the size of the imaging range 31 may be smaller than the size of the area of interest R2.

Figure 3:
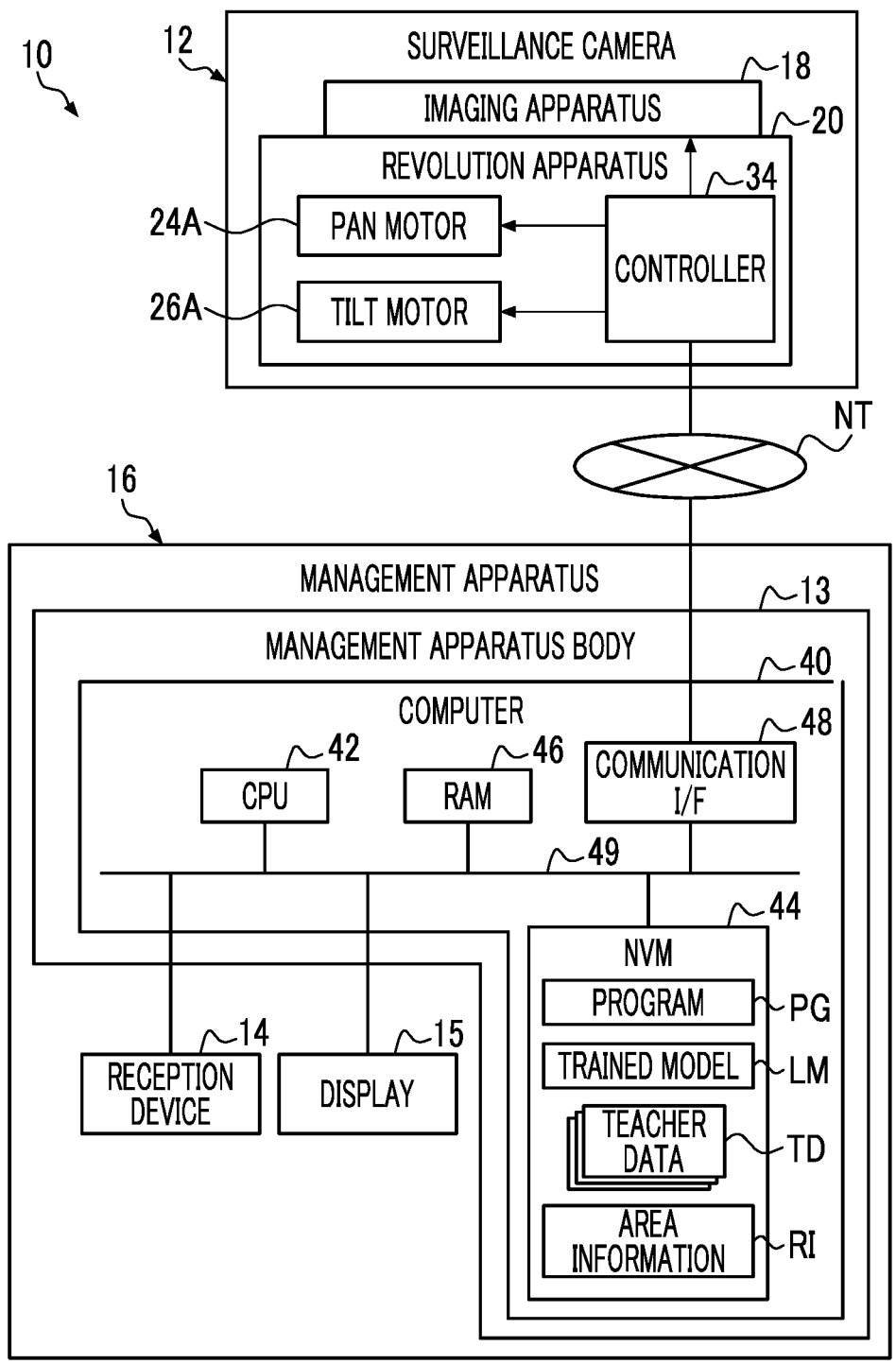
FIG. 3 is a block diagram showing an example of a hardware configuration of a surveillance camera and a management apparatus.

As shown in FIG. 3 as an example, the revolution apparatus 20 of the surveillance camera 12 comprises a controller 34. The controller 34 controls the operations of the pan motor 24A, the tilt motor 26A, and the imaging apparatus 18 under the control of the management apparatus 16.

The management apparatus body 13 of the management apparatus 16 comprises the computer 40. The computer 40 includes a CPU 42, an NVM 44, a RAM 46, and a communication I/F 48. The management apparatus 16 is an example of a "control apparatus" according to the technology of the present disclosure. The computer 40 is an example of a "computer" according to the technology of the present disclosure. The CPU 42 is an example of a "processor" according to the technology of the present disclosure.

The CPU 42, the NVM 44, the RAM 46, and the communication I/F 48 are connected to a bus 49. In the example shown in FIG. 3, for convenience of illustration, one bus is shown as the bus 49, but a plurality of buses may be used. The bus 49 may be a serial bus, or may be a parallel bus including a data bus, an address bus, a control bus, and the like.

Various types of data are stored in the NVM 44. Here, examples of the NVM 44 include various non-volatile storage devices, such as an EEPROM, an SSD, and/or an HDD. The RAM 46 transitorily stores various types of information, and is used as a work memory. Examples of the RAM 46 include a DRAM or an SRAM.

A program PG is stored in the NVM 44. The CPU 42 reads out a necessary program from the NVM 44, and executes the read out program PG on the RAM 46. The CPU 42 controls the entire surveillance system 10 including the management apparatus 16 by executing the process according to the program PG.

The communication I/F 48 is an interface realized by a hardware resource, such as an FPGA. The communication I/F 48 is communicably connected to the controller 34 of the surveillance camera 12 via the communication network NT, and exchanges various types of information between the CPU 42 and the controller 34.

The reception device 14 and the display 15 are also connected to the bus 49, and the CPU 42 operates according to the instruction received by the reception device 14 and displays various types of information on the display 15.

In addition, a trained model LM for performing the object detection described above is stored in the NVM 44. The trained model LM is a trained model for the object detection generated by performing machine learning by using a plurality of teacher data. Further, teacher data TD is stored in the NVM 44. The teacher data TD is teacher data for additional training for additionally training the trained model LM. The teacher data TD is data based on an operation of the user acquired in the manual surveillance mode.

In addition, the area information RI is stored in the NVM 44.

Figure 4:
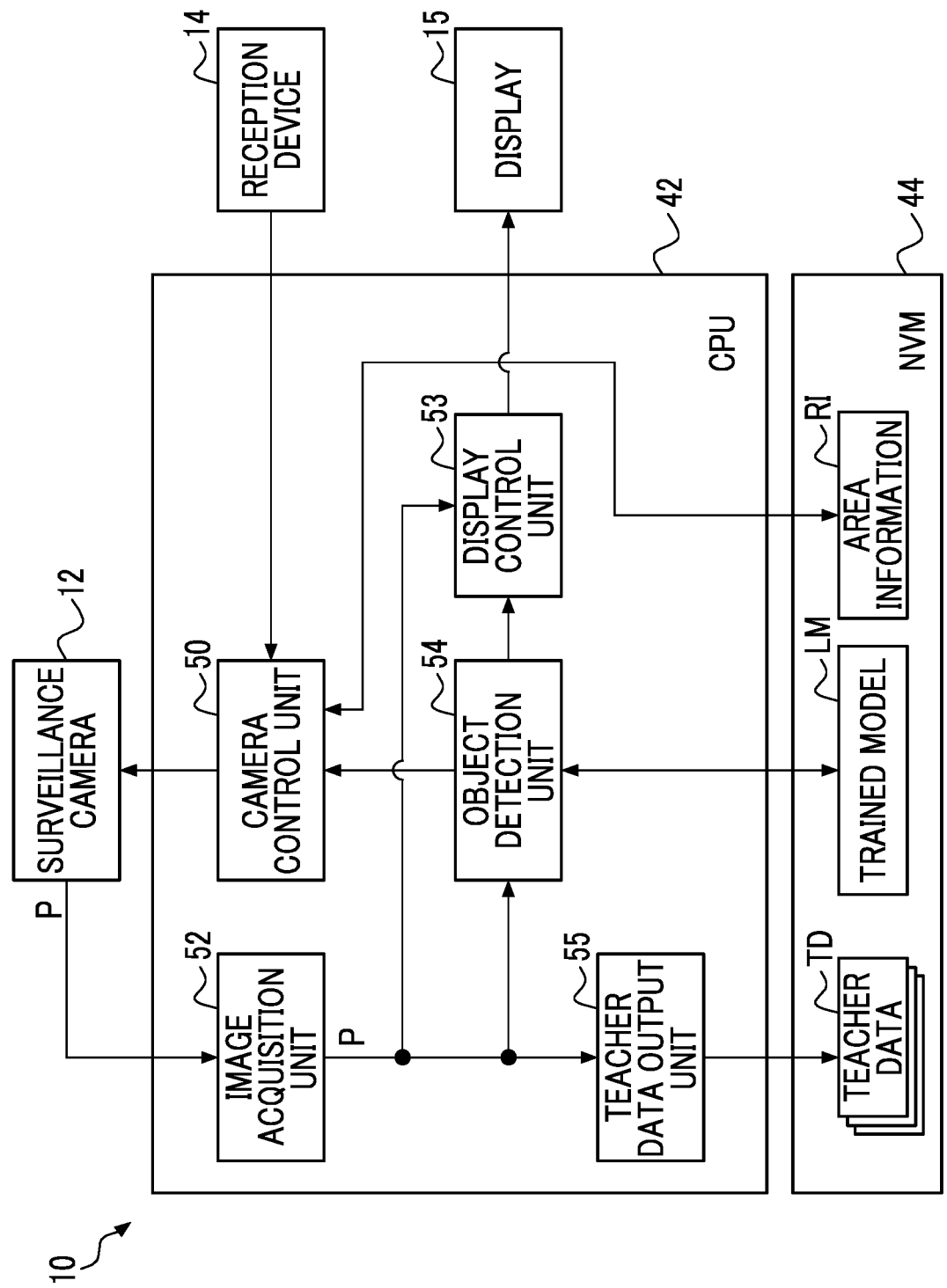
FIG. 4 is a block diagram showing an example of a function of a CPU provided in the management apparatus.

As shown in FIG. 4 as an example, a plurality of functional units are realized by the CPU 42 executing the operation based on the program PG. The program PG causes the CPU 42 to function as a camera control unit 50, an image acquisition unit 52, a display control unit 53, an object detection unit 54, and a teacher data output unit 55.

The camera control unit 50 controls the controller 34 of the surveillance camera 12 to cause the imaging apparatus 18 to perform an imaging operation and the zoom, and to cause the revolution apparatus 20 to perform the pan and the tilt. That is, the camera control unit 50 causes the surveillance camera 12 to perform the imaging operation and to change the imaging range 31.

In addition, the camera control unit 50 performs switching control of switching the operation mode of the surveillance camera 12 between the automatic surveillance mode and the manual surveillance mode. In a case of the automatic surveillance mode, the camera control unit 50 executes the automatic PTZ of changing the imaging range 31 according to a result of the object detection by the object detection unit 54. In a case of the manual surveillance mode, in addition to the automatic PTZ, the camera control unit 50 makes the manual PTZ of changing the imaging range 31 effective according to an instruction given to the reception device 14.

The image acquisition unit 52 acquires a captured image P output from the surveillance camera 12 by causing the surveillance camera 12 to perform imaging by the camera control unit 50. The image acquisition unit 52 supplies the captured image P acquired from the surveillance camera 12 to the display control unit 53. The display control unit 53 displays the captured image P supplied from the image acquisition unit 52 on the display 15.

In addition, in a case of the automatic surveillance mode, the image acquisition unit 52 supplies the captured image P acquired from the surveillance camera 12 to the object detection unit 54. In addition, in a case of the manual surveillance mode, the image acquisition unit 52 supplies the captured image P acquired from the surveillance camera 12 to the object detection unit 54 and the teacher data output unit 55.

The object detection unit 54 performs a dangerous object detection process of detecting the dangerous object that appears in the captured image P by using the trained model LM stored in the NVM 44. In a case in which the dangerous object is detected, the object detection unit 54 supplies the detection result of the dangerous object to the display control unit 53 and the camera control unit 50. The display control unit 53 displays the detected dangerous object on the display 15 in a distinguishable manner based on the detection result supplied from the object detection unit 54. The camera control unit 50 changes the position of the imaging range 31 based on the detection result supplied from the object detection unit 54 such that the detected dangerous object is positioned at the center of the imaging range 31. That is, the camera control unit 50 changes the position of the imaging range 31 to track the dangerous object.

In addition, the camera control unit 50 tracks the dangerous object detected in the general area R1, causes the zoom to change the region including the dangerous object according to the fact that the dangerous object enters the area of interest R2, and switches the operation mode of the surveillance camera 12 from the automatic surveillance mode to the manual surveillance mode. The user can perform the detailed confirmation of the dangerous object by changing the imaging range 31 by the manual PTZ in the manual surveillance mode.

The teacher data output unit 55 generates and outputs the teacher data TD according to the manual operation performed by the user with respect to the surveillance camera 12 by using the reception device 14 in the manual surveillance mode. The NVM 44 stores the teacher data TD output by the teacher data output unit 55. The teacher data TD is, for example, a history of the manual operation (that is, an operation amount related to the manual PTZ). That is, in the manual surveillance mode, the history of the manual operation in a case in which the user performs the detailed confirmation of the dangerous object is output as the teacher data TD.

The trained model LM is configured by using a neural network. The trained model LM is configured by using, for example, a deep neural network (DNN), which is a multi-layer neural network that is a target of deep learning (DL). As the DNN, for example, a convolutional neural network (CNN) that uses an image as a target is used.

Figure 5:
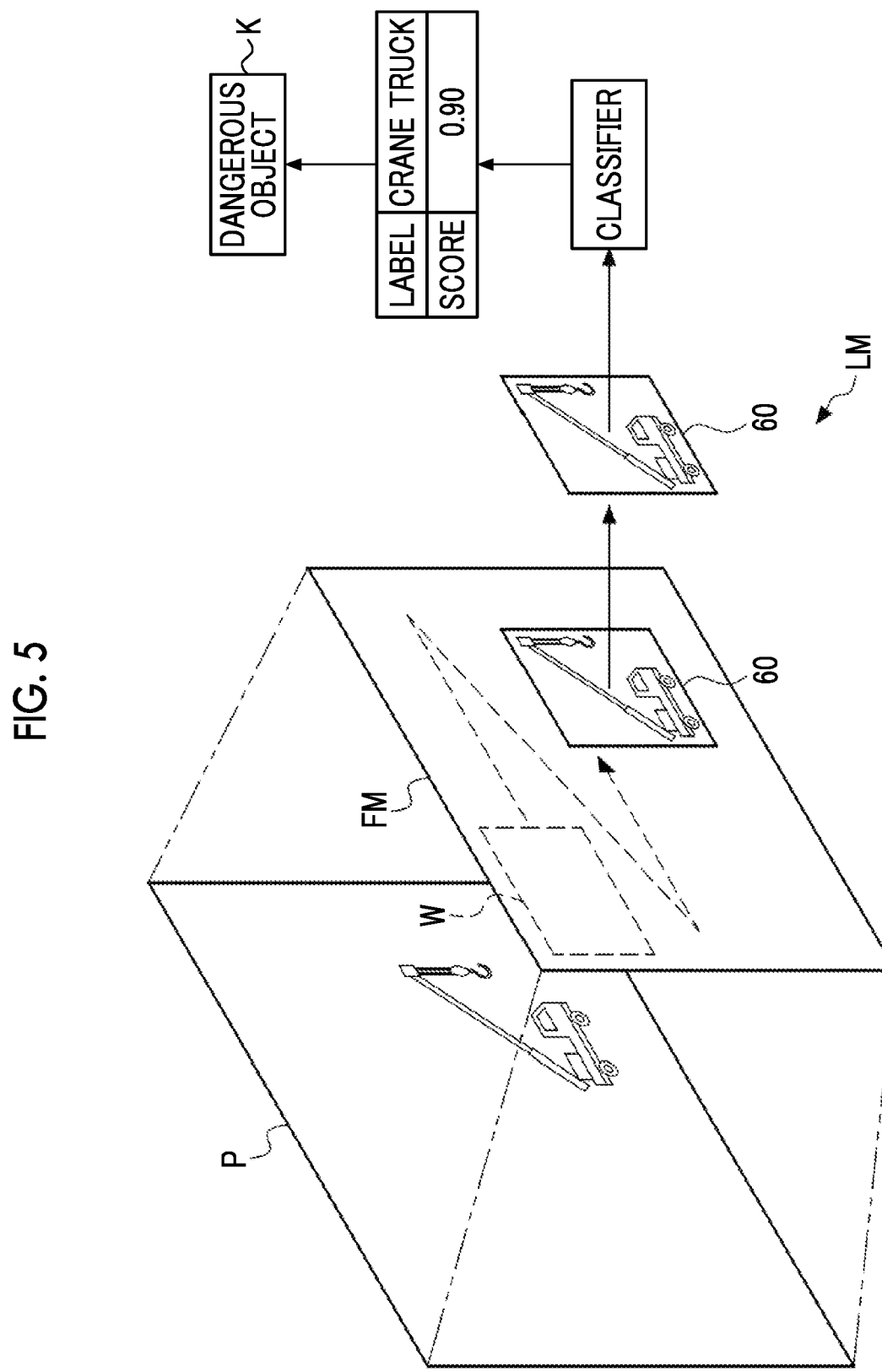
FIG. 5 is a conceptual diagram showing an example of an object detection process.

FIG. 5 shows an example of an object detection process by the object detection unit 54 using the trained model LM. In the present embodiment, the trained model LM is configured by using the CNN. The object detection unit 54 inputs the captured image P as the input image to the trained model LM. The trained model LM generates a feature map FM representing a feature amount of the captured image P by the convolutional layer.

The object detection unit 54 slides windows W of various sizes with respect to the feature map FM, and determines whether or not an object candidate is present in the window W. In a case of determining that the object candidate is present in the window W, the object detection unit 54 cuts out an image 60 in the window W including the object candidate from the feature map FM, and inputs the cutout image 60 to a classifier. The classifier outputs a label and a score of the object candidate included in the image 60. The label represents a type of the object. The score represents a probability that the object candidate is the type of the object represented by the label. The object detection unit 54 determines whether or not the object candidate is the dangerous object (heavy machine or the like) based on the label and the score, and outputs detection information on the dangerous object in a case in which the object candidate is the dangerous object. In the example shown in FIG. 5, the crane truck that appears in the captured image P is detected as a dangerous object K.

It should be noted that, in the example shown in FIG. 5, one dangerous object K is detected from the captured image P, but two or more dangerous objects K may be detected.

Figure 6:
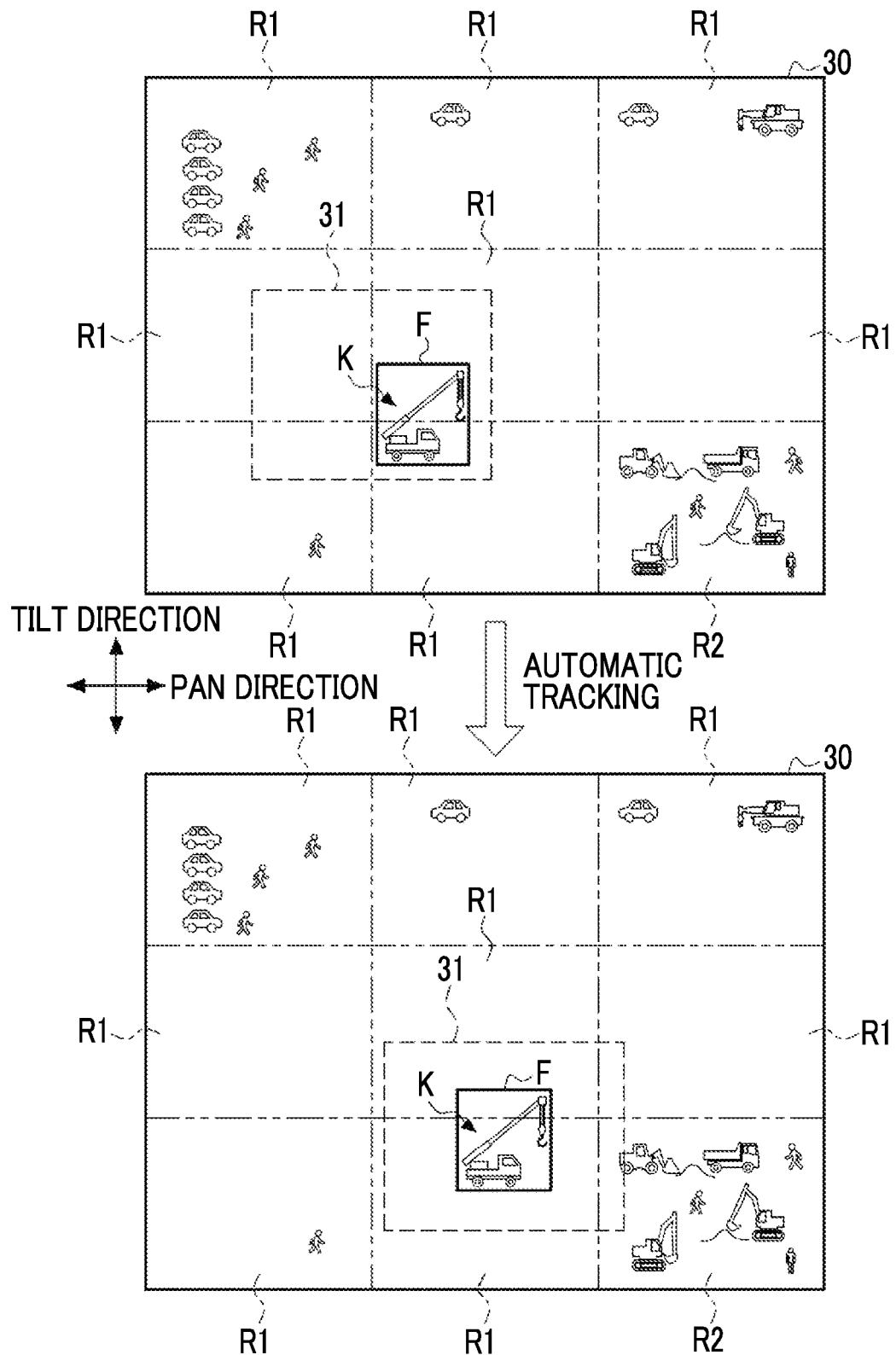
FIG. 6 is a conceptual diagram showing an example of automatic tracking of a dangerous object in an automatic surveillance mode.

FIG. 6 shows an example of automatic tracking of the dangerous object K in the automatic surveillance mode. As described above, in the automatic surveillance mode, the dangerous object detection process is performed by the object detection unit 54 each time the position of the imaging range 31 is changed while the position of the imaging range 31 is changed along the route 32 (see FIG. 2) set in the surveillance region 30. As shown in FIG. 6 as an example, in a case in which the dangerous object K is detected from the inside of the imaging range 31 in the general area R1, the camera control unit 50 changes the position of the imaging range 31 to track the dangerous object K. In the example shown in FIG. 6, the position of the imaging range 31 is changed by causing the surveillance camera 12 to perform the pan and the tilt such that the dangerous object K is positioned at the center according to the movement of the dangerous object K.

It should be noted that, in a case in which two or more dangerous objects are detected by the dangerous object detection process, the camera control unit 50 uses one dangerous object as a tracking target, for example, based on the label and the score.

Figure 7:
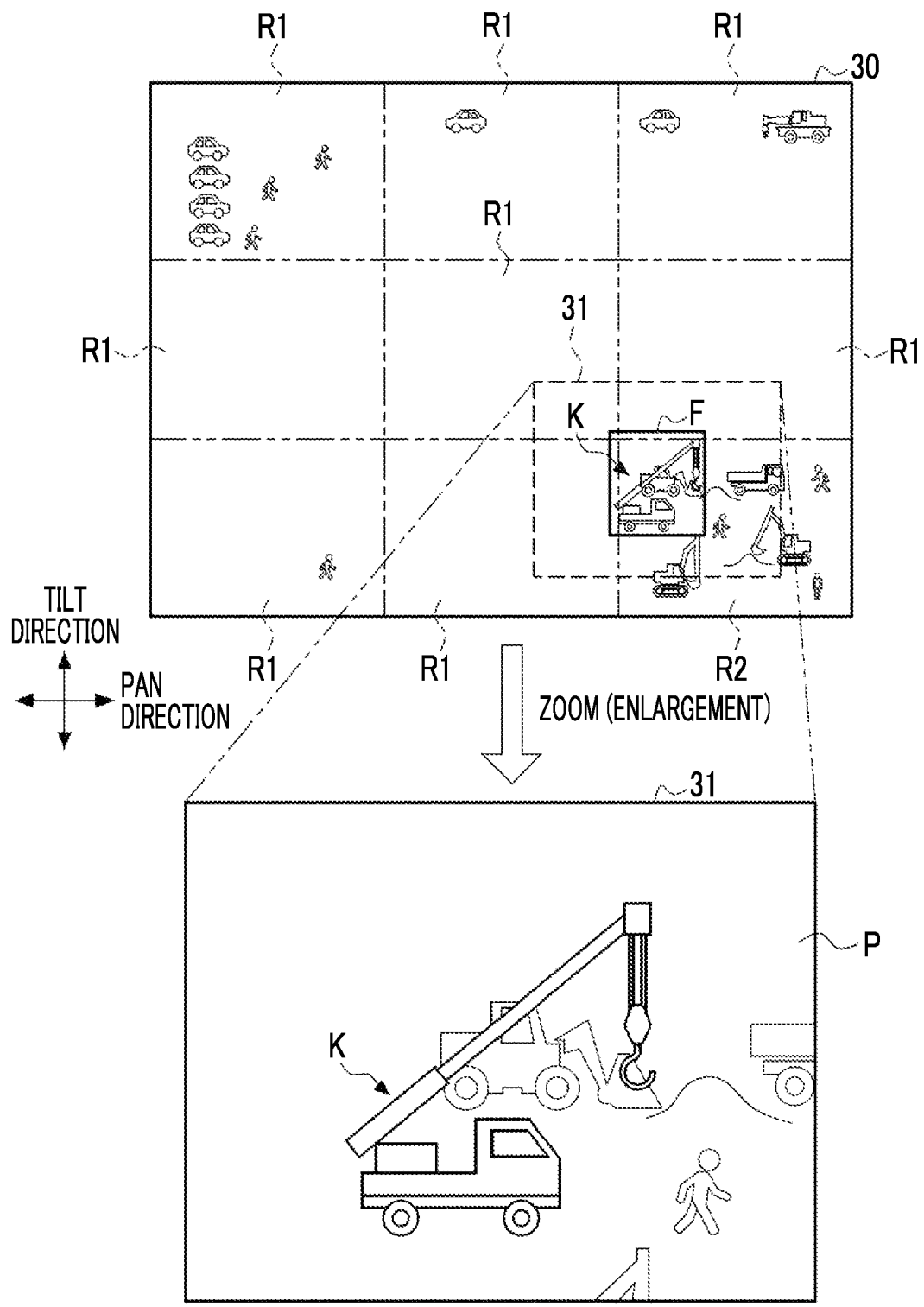
FIG. 7 is a conceptual diagram showing an example of switching an operation mode from the automatic surveillance mode to a manual surveillance mode.

FIG. 7 shows an example of switching the operation mode from the automatic surveillance mode to the manual surveillance mode. As shown in FIG. 7 as an example, in a case in which the camera control unit 50 detects entering of the dangerous object K that is tracked into the area of interest R2, the camera control unit 50 causes the surveillance camera 12 to perform the zoom to enlarge the region including the dangerous object K. As a result, the dangerous object K is enlarged and displayed in the captured image P. In addition, the camera control unit 50 switches the operation mode from the automatic surveillance mode to the manual surveillance mode in a case in which entering of the tracking dangerous object K into the area of interest R2 is detected. The user can confirm the dangerous object K by enlarging and displaying the dangerous object K. The user can change the imaging range 31 by the manual PTZ in a case in which the user wants to further perform the detailed confirmation of a part of the dangerous object K or the like.

Figure 8:
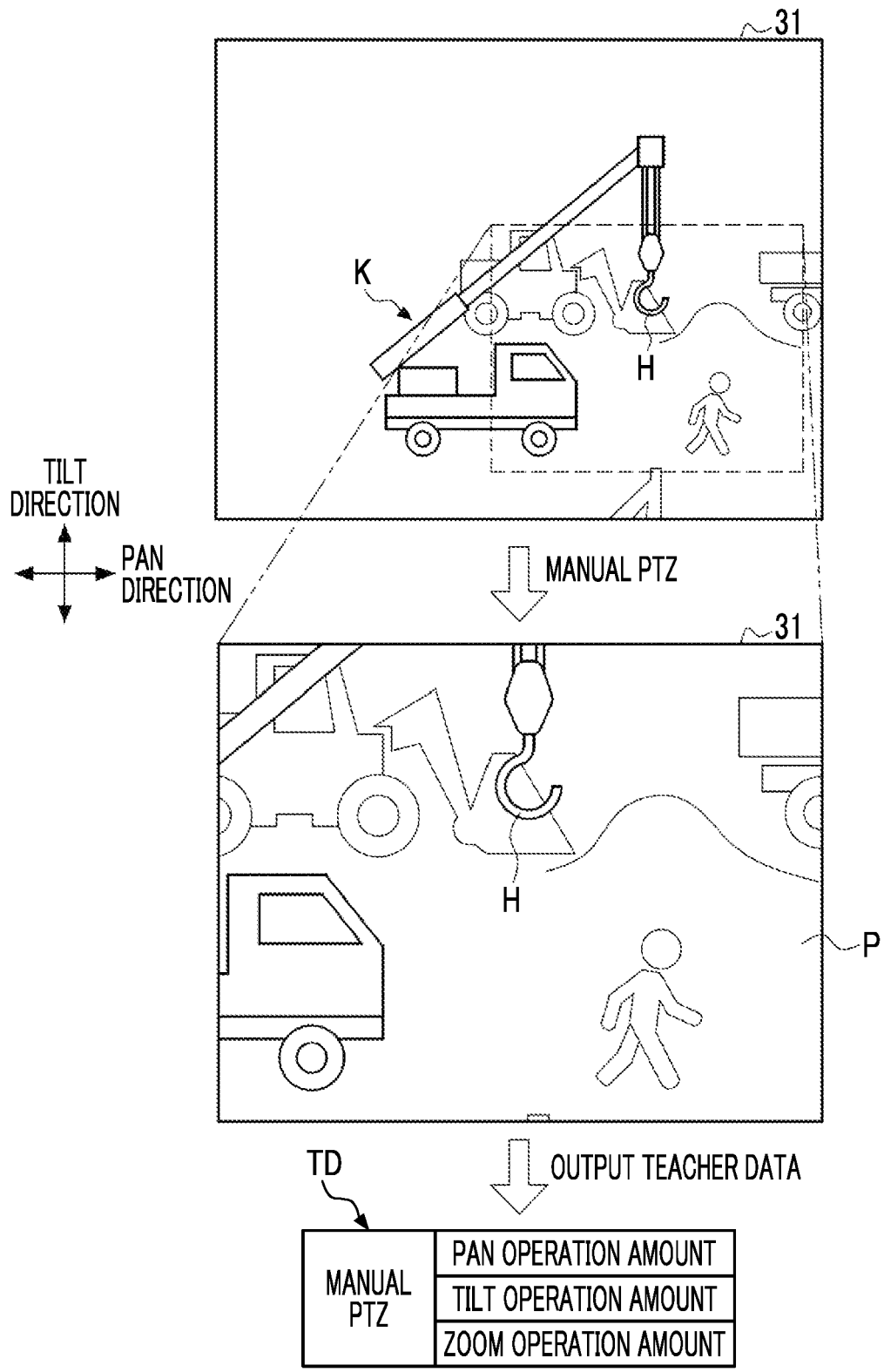
FIG. 8 is a conceptual diagram showing an example of manual PTZ in the manual surveillance mode.

FIG. 8 shows an example of the manual PTZ in the manual surveillance mode. As shown in FIG. 8 as an example, the camera control unit 50 changes the imaging range 31 according to the operation of the reception device 14 by the user. In the example shown in FIG. 8, the user takes an interest in a portion of a region below a hook H of the crane truck as the dangerous object K, and performs the manual PTZ to enlarge the region below the hook H. This is because, in a case of the crane truck, a degree of risk is high below the hook H (below the suspended load in a case in which the suspended load is hung on the hook H), and it is preferable to perform the detailed confirmation whether or not the worker or the like is present. As described above, among the dangerous objects K, the region of interest that the user takes an interest in for the detailed confirmation differs depending on the type of the dangerous object K. For example, in a case in which the dangerous object K is the road roller, the user performs the detailed confirmation as to whether or not the worker or the like is present, with a front portion of a roller as the region of interest.

After the user performs the manual PTZ, the teacher data output unit 55 outputs operation amounts (pan operation amount, tilt operation amount, and zoom operation amount) related to the manual PTZ as the teacher data TD. It is not easy to detect the region of interest of the dangerous object K that the user takes an interest in for the detailed confirmation by object detection, but it is possible to estimate the region of interest in addition to the detection of the dangerous object K by performing machine learning using the teacher data TD representing the history of the manual operation for the detailed confirmation.

Hereinafter, an action of the surveillance system 10 will be described with reference to FIG. 9.

Figure 9:
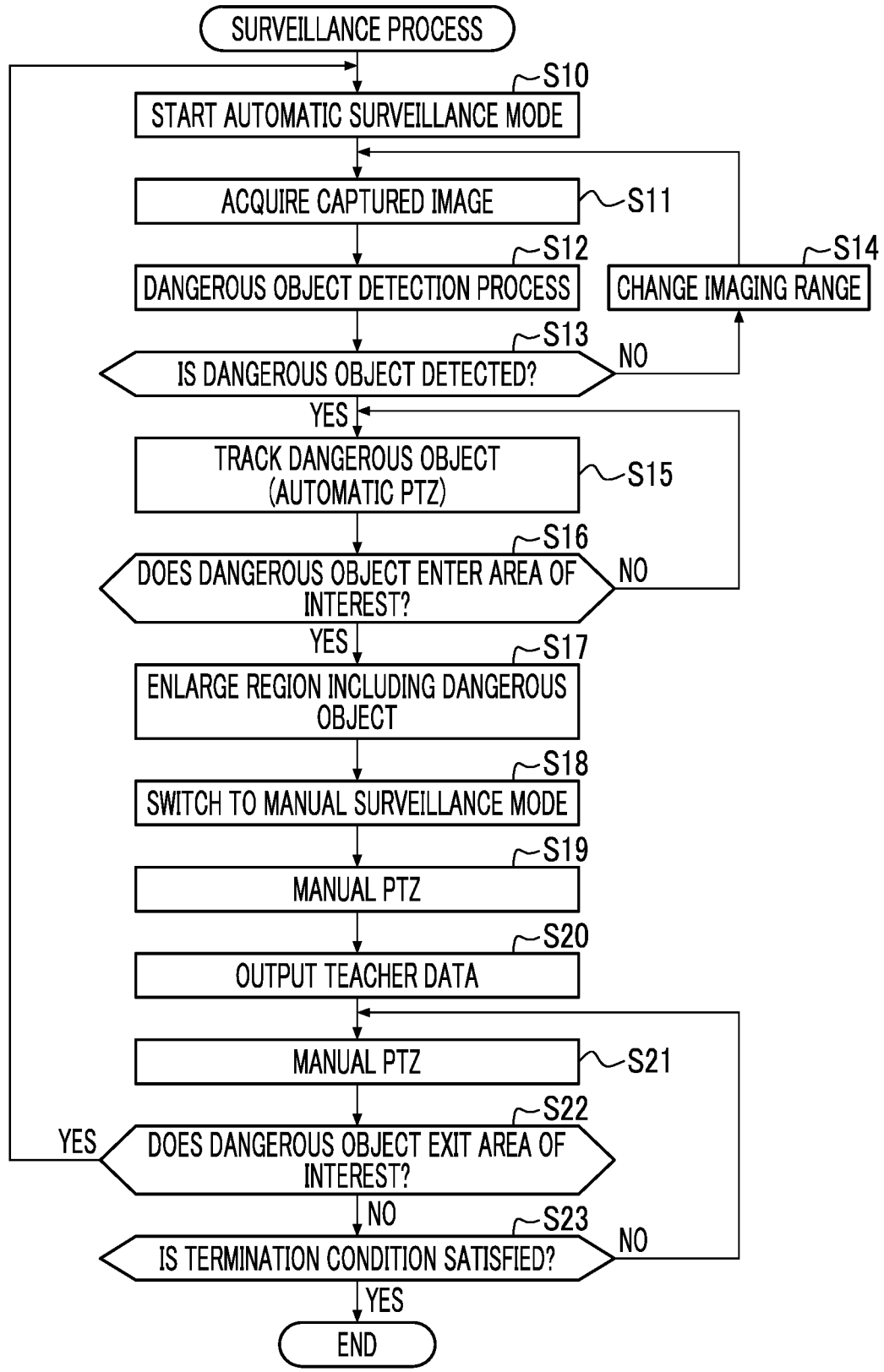
FIG. 9 is a flowchart showing an example of a flow of a surveillance process.

FIG. 9 shows a flowchart showing an example of a flow of a surveillance process executed by the CPU 42. It should be noted that the flow of the surveillance process shown in FIG. 9 is an example of a "control method" according to the technology of the present disclosure. In addition, here, for convenience of description, the description will be made on the premise that the imaging by the imaging apparatus 18 is performed at a predetermined frame rate.

In the surveillance process shown in FIG. 9, first, in step S10, the camera control unit 50 starts the automatic surveillance mode. In a case in which the automatic surveillance mode is started, the surveillance camera 12 performs the imaging operation by using the imaging range 31 (see FIG. 2) set in the surveillance region 30 as a target. After step S10, the surveillance process proceeds to step S11.

In step S11, the image acquisition unit 52 acquires the captured image P output from the surveillance camera 12, and supplies the acquired captured image P to the object detection unit 54. In this case, the captured image P is displayed on the display 15 via the display control unit 53. After step S11, the surveillance process proceeds to step S12.

In step S12, the object detection unit 54 performs the dangerous object detection process of detecting the dangerous object K from the captured image P by using the trained model LM (see FIG. 5). After step S12, the surveillance process proceeds to step S13.

In step S13, the camera control unit 50 determines whether or not the dangerous object K is detected by the object detection unit 54. In a case in which the object is not detected in step S13, a negative determination is made, and the surveillance process proceeds to step S14. In a case in which the object is detected in step S13, a positive determination is made, and the surveillance process proceeds to step S15.

In step S14, the camera control unit 50 causes the surveillance camera 12 to perform the pan or the tilt to change the imaging range 31 in the pan direction or the tilt direction along the route 32 (see FIG. 2). After step S14, the surveillance process returns to step S11. In step S11, the image acquisition unit 52 performs the captured image acquisition process again.

In step S15, the camera control unit 50 performs the automatic PTZ of changing the imaging range 31 according to the detection result of the dangerous object K detected by the object detection unit 54 (see FIG. 6). That is, the camera control unit 50 automatically tracks the dangerous object K. After step S15, the surveillance process proceeds to step S16.

In step S16, the camera control unit 50 determines whether or not the dangerous object K being tracked enters the area of interest R2 from the general area R1. The determination as to whether or not the dangerous object K enters the area of interest R2 is determined based on, for example, a relationship between the coordinates related to the pan and the tilt of the surveillance camera 12 and the coordinates of the area of interest R2. In step S16, in a case in which the dangerous object K being tracked does not enter the area of interest R2, a negative determination is made, and the surveillance process returns to step S15. In step S16, in a case in which the dangerous object K being tracked enters the area of interest R2, a positive determination is made, and the surveillance process proceeds to step S17.

In step S17, the camera control unit 50 causes the surveillance camera 12 to perform the zoom to enlarge the region including the dangerous object K (see FIG. 7). After step S17, the surveillance process proceeds to step S18.

In step S18, the camera control unit 50 switches the operation mode of the surveillance camera 12 from the automatic surveillance mode to the manual surveillance mode. After step S18, the surveillance process proceeds to step S19.

In step S19, the camera control unit 50 performs the manual PTZ of changing the imaging range 31 according to the instruction given by the user to the reception device 14 (see FIG. 8). It should be noted that, in a case in which the manual PTZ is not performed by the user, the camera control unit 50 automatically tracks the dangerous object K by the automatic PTZ. After step S19, the surveillance process proceeds to step S20.

In step S20, the teacher data output unit 55 outputs the operation amounts (pan operation amount, tilt operation amount, and zoom operation amount) related to the manual PTZ as the teacher data TD (see FIG. 8). After step S20, the surveillance process proceeds to step S21.

In step S21, the camera control unit 50 performs the manual PTZ of changing the imaging range 31 according to the instruction given by the user to the reception device 14. That is, the user continues the manual surveillance by the manual PTZ. It should be noted that, in a case in which the manual PTZ is not performed by the user, the camera control unit 50 automatically tracks the dangerous object K by the automatic PTZ. After step S21, the surveillance process proceeds to step S22.

In step S22, the camera control unit 50 determines whether or not the dangerous object K being tracked exits the area of interest R2. The determination as to whether or not the dangerous object K being tracked exits the area of interest R2 is determined based on, for example, a relationship between the coordinates related to the pan and the tilt of the surveillance camera 12 and the coordinates of the area of interest R2. In step S22, in a case in which the dangerous object K being tracked exits the area of interest R2, the surveillance process returns to step S10. In step S22, in a case in which the dangerous object K being tracked does not exit the area of interest R2, the surveillance process proceeds to step S23.

In step S23, the camera control unit 50 determines whether or not a condition for terminating the surveillance process (hereinafter, referred to as "termination condition") is satisfied. Examples of the termination condition is a condition that the reception device 14 receives an instruction to terminate the surveillance process. In step S23, in a case in which the termination condition is not satisfied, a negative determination is made, and the surveillance process returns to step S21. In step S23, in a case in which the termination condition is satisfied, a positive determination is made, and the surveillance process is terminated.

As described above, the management apparatus 16 as the control apparatus can switch the operation mode between the first surveillance mode (automatic surveillance mode) and the second surveillance mode (manual surveillance mode) in which the target object is imaged according to the manual operation performed with respect to the surveillance camera 12 is effective in addition to the first surveillance mode. The management apparatus 16 divides the surveillance region 30 into the first region (general area R1) and the second region (area of interest R2), and switches the operation mode from the first surveillance mode to the second surveillance mode according to the fact that the target object (dangerous object K) tracked in the first surveillance mode in the first region enters the second region. As a result, a burden on the user related to the surveillance of the target object can be reduced.

In addition, in the first surveillance mode, the management apparatus 16 images the surveillance region 30 by causing the surveillance camera 12 to perform the pan and the tilt to change the imaging range 31, so that the surveillance region 30 can be enlarged from the imaging range 31.

In addition, the management apparatus 16 causes the surveillance camera 12 to perform the zoom to change the region including the target object according to the fact that the target object tracked in the automatic surveillance mode in the first region enters the second region, so that a burden on the user related to the zoom operation can be reduced.

In addition, in the second surveillance mode, the management apparatus 16 causes the surveillance camera to perform at least any one of the pan, the tilt, or the zoom according to the manual operation, so that the user can confirm the details of the target object by his/her own intention.

In addition, in the second surveillance mode, the management apparatus 16 outputs the history of the manual operation as the teacher data by the machine learning, so that the teacher data TD for improving the surveillance accuracy can be efficiently collected.

In addition, the management apparatus 16 switches the operation mode from the second surveillance mode to the first surveillance mode according to the fact that the target object exits the second region, so that a burden on the user related to the surveillance of the target object can be reduced. In addition, in the first surveillance mode, the management apparatus 16 detects the target object by using the trained model that has been trained through the machine learning, so that a burden on the user related to the surveillance of the target object can be reduced.

Hereinafter, various modification examples of the embodiment described above will be described.

First Modification Example

Figure 10:
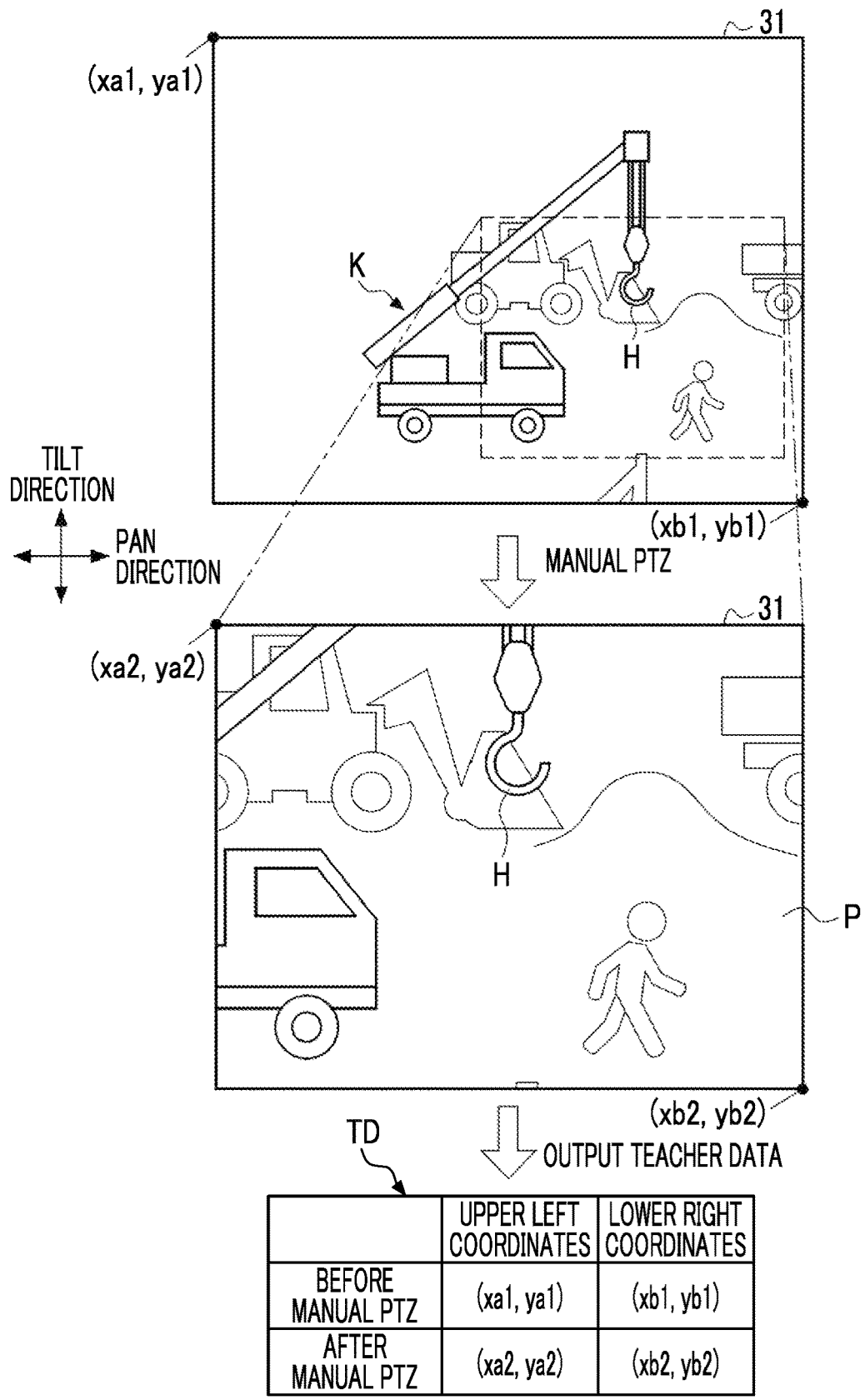
FIG. 10 is a conceptual diagram showing a teacher data output process according to a first modification example.

In the embodiment described above, the teacher data output unit 55 outputs the operation amounts (pan operation amount, tilt operation amount, and zoom operation amount) related to the manual operation (manual PTZ) as the teacher data TD. Instead, in a first modification example, as shown in FIG. 10 as an example, the teacher data output unit 55 outputs the coordinates of the imaging range 31 before and after the manual operation as the teacher data TD. In the example shown in FIG. 10, (xa1, ya1) and (xb1, yb1) represent the upper left coordinates and the lower right coordinates of the imaging range 31 before the manual operation, respectively. (xa2, ya2) and (xb2, yb2) represent the upper left coordinates and the lower right coordinates of the imaging range 31 after the manual operation, respectively.

Second Modification Example

Figure 11:
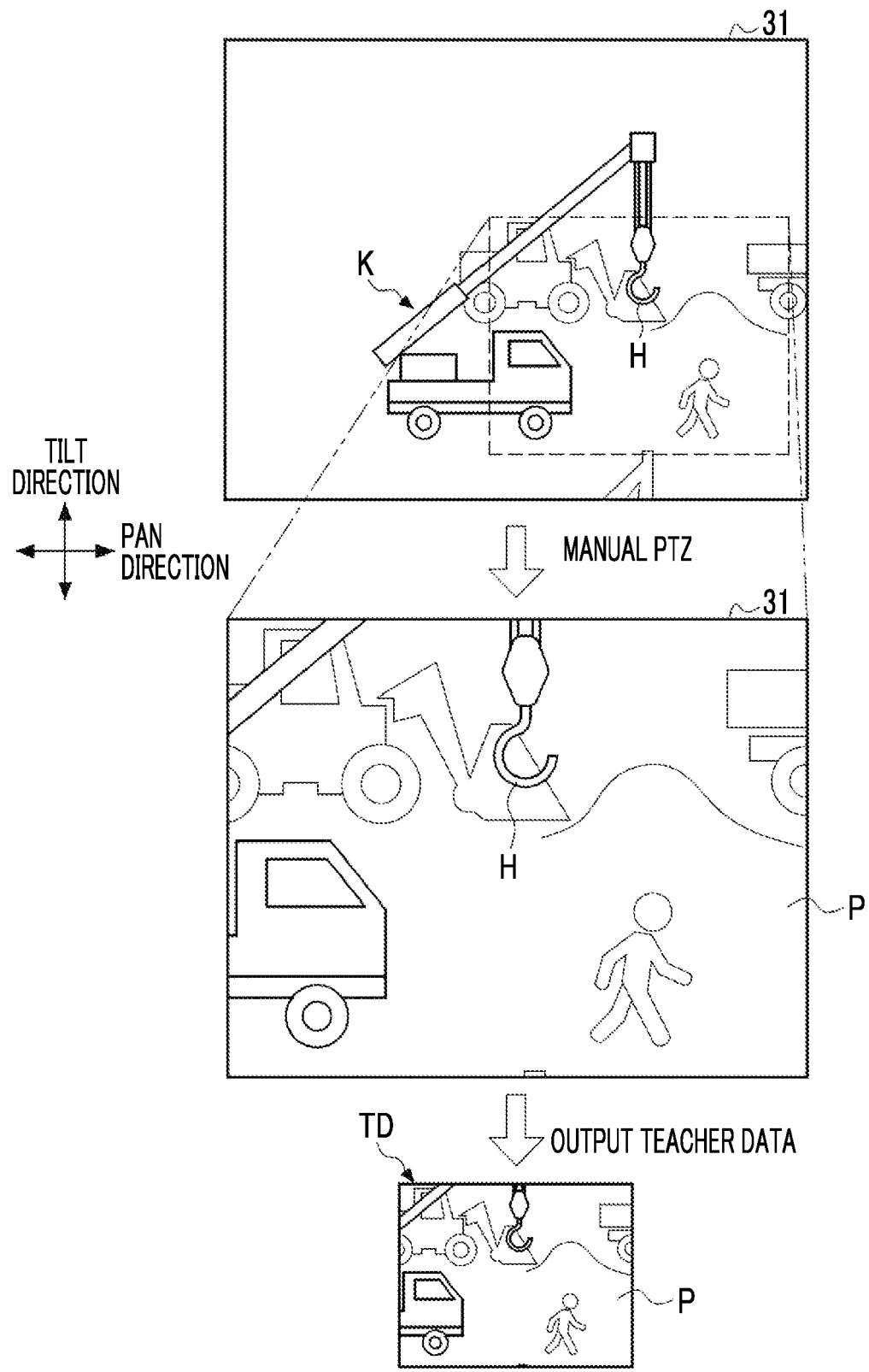
FIG. 11 is a conceptual diagram showing a teacher data output process according to a second modification example.

In a second modification example, as shown in FIG. 11 as an example, the teacher data output unit 55 outputs the captured image P captured by the surveillance camera 12 after the manual operation (manual PTZ) as the teacher data TD. Since the captured image P after the manual operation represents the region of interest that the user takes an interest in, it is possible to automatically estimate the region of interest of the user in the image including the dangerous object K by performing machine learning of features of the structure of the heavy machine or the like that appears in the captured image P after the manual operation (for example, a tire of the heavy machine or a traffic cone).

Third Modification Example

In the embodiment described above, after the dangerous object K enters the area of interest R2 and the teacher data output unit 55 outputs the teacher data TD by the manual operation is performed in the manual surveillance mode, the manual surveillance is continued until the dangerous object K exits the area of interest R2. On the other hand, in a third modification example, after the teacher data output unit 55 outputs the teacher data TD by performing the manual operation in the manual surveillance mode, the object in the region of interest that the user takes an interest in is set as the tracking target by the manual operation, and the automatic tracking is performed until the dangerous object K exits the area of interest R2.

Figure 12:
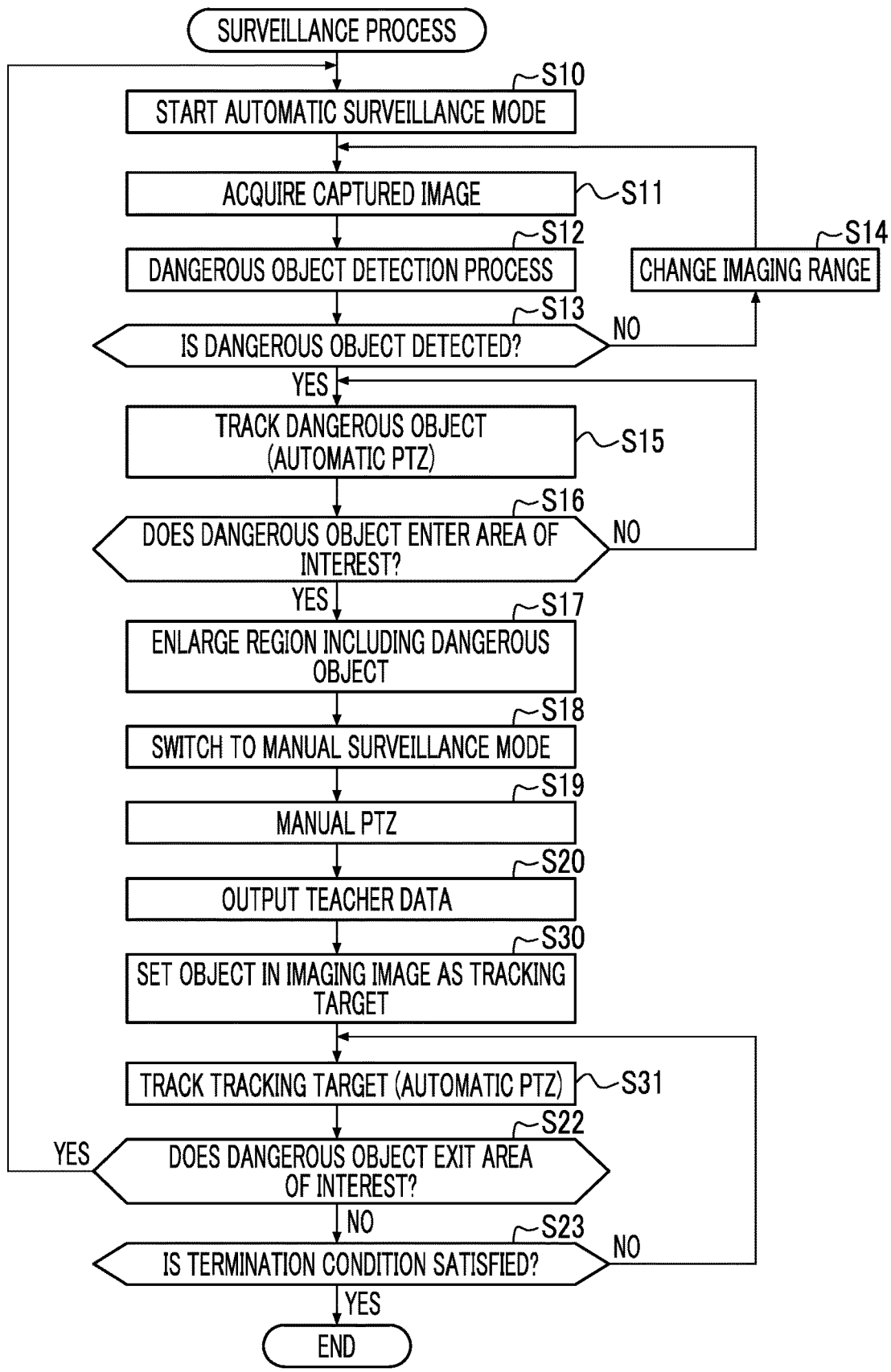
FIG. 12 is a flowchart showing an example of a flow of a surveillance process according to a third modification example.

FIG. 12 shows an example of a flow of the surveillance process according to the present modification example. In the present modification example, step S30 and step S31 are executed between step S20 and step S22 instead of step S21 shown in FIG. 9. In the present modification example, after the teacher data output unit 55 outputs the teacher data TD in step S20, the surveillance process proceeds to step S30.

In step S30, the camera control unit 50 sets the object, which appears in the captured image P captured by the surveillance camera 12 after the manual operation, as the tracking target. For example, the camera control unit 50 sets the tracking target based on the result of the object detection detected by the object detection unit 54. After step S30, the surveillance process proceeds to step S31.

In step S31, the camera control unit 50 changes the imaging range 31 by executing the automatic PTZ to track the tracking target. The camera control unit 50 causes the surveillance camera 12 to perform at least any one of the pan, the tilt, or the zoom. After step S31, the surveillance process proceeds to step S22.

It should be noted that, in the present modification example, in a case in which a negative determination is made in step S23, the surveillance process returns to step S31.

Figure 13:
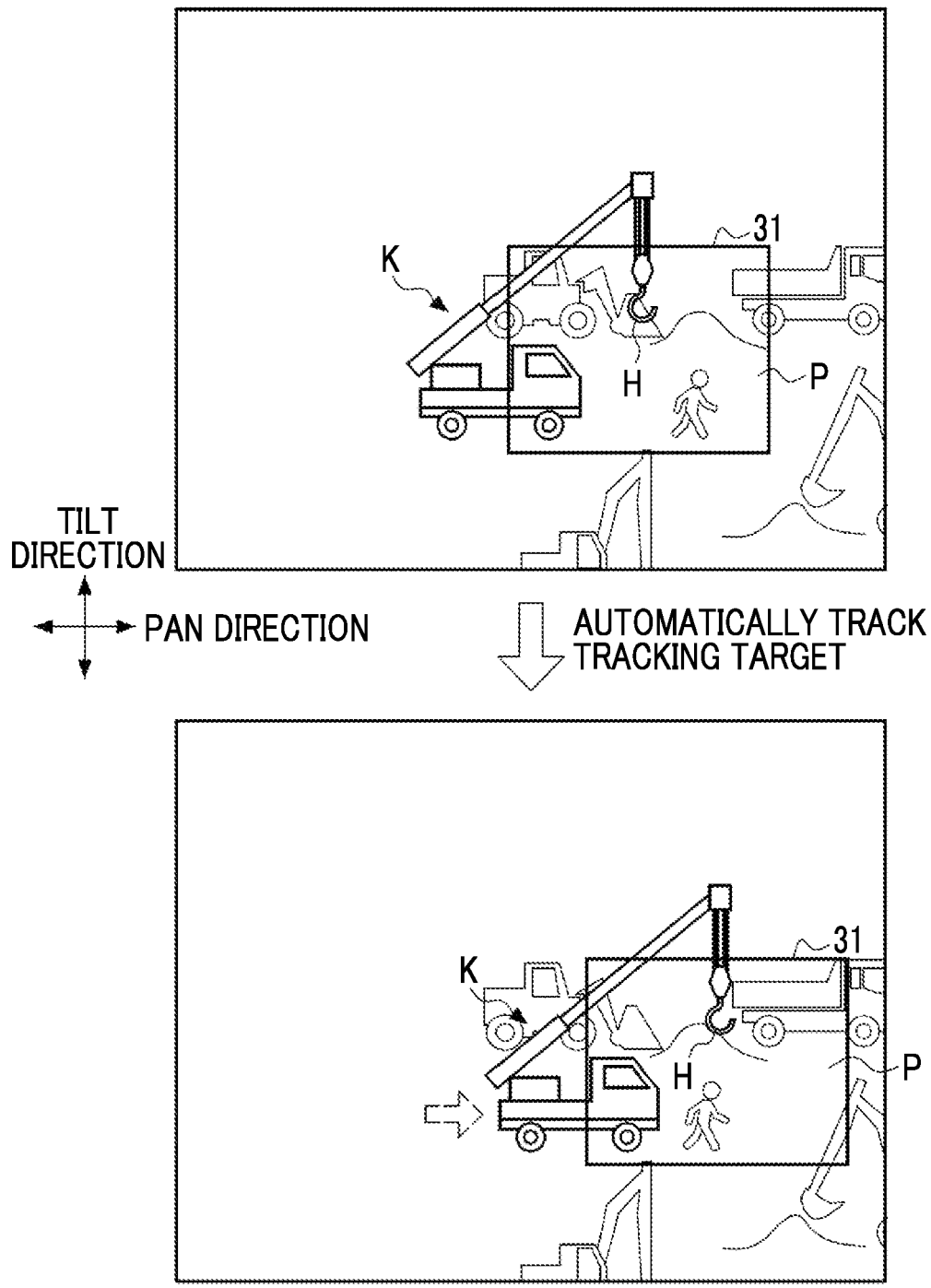
FIG. 13 shows an example of automatic tracking in a manual surveillance mode according to the third modification example.

FIG. 13 shows an example of the automatic tracking in steps S30 and S31. As shown in FIG. 13 as an example, for example, the camera control unit 50 sets the hook H of the crane truck as the tracking target as the object that appears in the captured image P after the manual operation, and executes the automatic PTZ to track the hook H.

As described above, with the present modification example, it is possible to automatically track the portion for which the detailed confirmation is performed by the user in the manual surveillance mode, and a burden on the user related to the surveillance of the target object can be reduced.

It should be noted that, in the embodiment described above and each of the modification examples described above, in the automatic surveillance mode, the surveillance camera 12 is caused to perform the pan and the tilt, and the imaging range 31 is moved in the surveillance region 30 along the route 32 (see FIG. 2) to surveil the surveillance region 30. Instead, a configuration may be adopted in which, without causing the surveillance camera 12 to perform the pan and the tilt, an angle of view is set to "wide angle" such that the imaging range 31 of the surveillance camera 12 includes the entire surveillance region 30, and the entire surveillance region 30 is imaged from a bird's eye view.

In this case, the camera control unit 50 tracks the dangerous object K based on a bird's-eye view image, and switches the angle of view of the surveillance camera 12 to "standard" while switching the operation mode to the manual surveillance mode in a case in which the dangerous object K being tracked enters the area of interest R2. Thereafter, the angle of view of the surveillance camera 12 is switched to "telephoto" by the manual operation by the user, and the detailed confirmation is performed. It should be noted that "wide angle", "standard", and "telephoto" represent relative relationships, and do not represent limited positions, such as both ends and the center of the focal length of the zoom lens.

Figure 14:
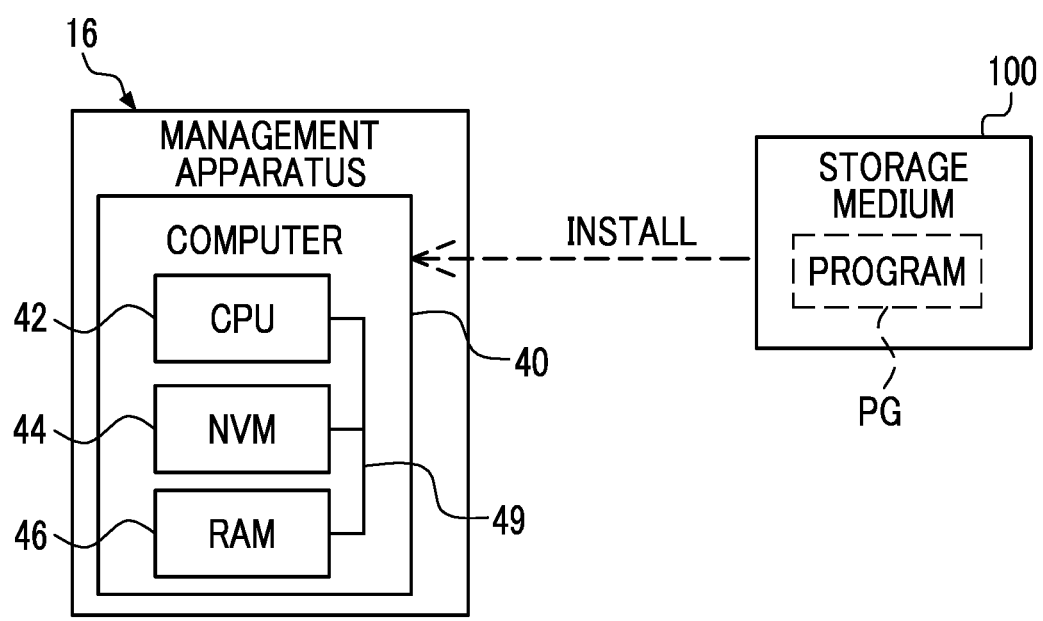
FIG. 14 is a block diagram showing an example of an aspect in which a program stored in a storage medium is installed in a computer.

In addition, in each embodiment described above, the program PG for the surveillance process is stored in the NVM 44 (see FIG. 3), but the technology of the present disclosure is not limited to this. As shown in FIG. 14 as an example, the program PG may be stored in any portable storage medium 100 that is a non-transitory storage medium, such as an SSD or a USB memory. In such a case, the program PG stored in the storage medium 100 is installed in the computer 40, and the CPU 42 executes the surveillance process described above according to the program PG.

In addition, the program PG may be stored in a storage device of another computer or server device connected to the computer 40 via a communication network (not shown), and the program PG may be downloaded and installed on the computer 40 according to a request from the management apparatus 16. In such a case, the surveillance process is executed by the computer 40 according to the installed program PG.

The following various processors can be used as a hardware resource for executing the surveillance process described above. Examples of the processor include a CPU which is a general-purpose processor functioning as the hardware resource for executing the surveillance process by executing software, that is, the program PG. Examples of the processor also include a dedicated electric circuit which is a processor having a circuit configuration specially designed for executing specific processing, such as an FPGA, a PLD, or an ASIC. The memory is built in or connected to any processor, and any processor executes the surveillance process by using the memory.

The hardware resource for executing the surveillance process may be configured by using one of these various processors, or may be configured by using a combination (for example, a combination of a plurality of FPGAs or a combination of a CPU and an FPGA) of two or more processors of the same type or different types. Also, the hardware resource for executing the surveillance process may be one processor.

A first example in which the hardware resource is configured by using one processor is a form in which one processor is configured by using a combination of one or more CPUs and software, and the processor functions as the hardware resource for executing the surveillance process, as represented by a computer, such as a client and a server. Secondly, as represented by SoC, there is a form in which a processor that realizes the functions of the entire system including a plurality of hardware resource for executing the surveillance process with one IC chip is used. In this way, the surveillance process is realized by using one or more of the various processors described above as the hardware resource.

Further, as the hardware structures of these various processors, more specifically, an electric circuit in which circuit elements, such as semiconductor elements, are combined can be used.

In addition, the surveillance process described above is merely an example. Therefore, it is needless to say that unnecessary steps may be deleted, new steps may be added, or the processing order may be changed within a range that does not deviate from the gist.

The described contents and the shown contents are the detailed description of the parts according to the technology of the present disclosure, and are merely examples of the technology of the present disclosure. For example, the description of the configuration, the function, the action, and the effect are the description of examples of the configuration, the function, the action, and the effect of the parts according to the technology of the present disclosure. Accordingly, it is needless to say that unnecessary parts may be deleted, new elements may be added, or replacements may be made with respect to the described contents and the shown contents within a range that does not deviate from the gist of the technology of the present disclosure. In addition, in order to avoid complications and facilitate understanding of the parts according to the technology of the present disclosure, the description of common technical knowledge or the like, which does not particularly require the description for enabling the implementation of the technology of the present disclosure, is omitted in the described contents and the shown contents.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be described by reference.

What is claimed is:

1. A control apparatus comprising:
    a processor that controls a surveillance camera that surveils a surveillance region,
    wherein the processor
    allows switching an operation mode of the surveillance camera between a first surveillance mode in which a target object present in the surveillance region is detected and tracked, and a second surveillance mode in which the target object is imaged according to a manual operation performed with respect to the surveillance camera,
    divides the surveillance region into a first region and a second region, and
    switches the operation mode from the first surveillance mode to the second surveillance mode and causes the surveillance camera to perform a zoom to enlarge a region including the target object according to a fact that the target object tracked in the first surveillance mode in the first region enters the second region,
    wherein, in the second surveillance mode, the processor causes the surveillance camera to perform at least any one of a pan, a tilt, or the zoom according to the manual operation, and outputs an image captured by the surveillance camera after the manual operation and a history of the manual operation as teacher data, wherein the processor switches the operation mode from the second surveillance mode to the first surveillance mode in response to the target object moving from the second region to the first region, and generates a trained model by performing machine learning using the teacher data, and wherein, in the first surveillance mode, the processor detects and tracks the target object using the generated trained model.

2. The control apparatus according to claim 1, wherein, in the first surveillance mode, the processor images the surveillance region by causing the surveillance camera to perform a pan and a tilt to change an imaging range.

3. The control apparatus according to claim 1, wherein, in the second surveillance mode, the processor detects an object that appears in the image captured by the surveillance camera after the manual operation, and tracks the detected object by causing the surveillance camera to perform at least any one of a pan, a tilt, or a zoom.

4. A control method of controlling a surveillance camera that surveils a surveillance region, the method comprising:

allowing switching an operation mode of the surveillance camera between a first surveillance mode in which a target object present in the surveillance region is detected and tracked, and a second surveillance mode in which the target object is imaged according to a manual operation performed with respect to the surveillance camera;

dividing the surveillance region into a first region and a second region;

switching the operation mode from the first surveillance mode to the second surveillance mode and causes the surveillance camera to perform a zoom to enlarge a region including the target object according to a fact that the target object tracked in the first surveillance mode in the first region enters the second region, wherein, in the second surveillance mode, the surveillance camera is caused to perform at least any one of a pan, a tilt, or the zoom according to the manual operation, and an image captured by the surveillance camera after the manual operation and a history of the manual operation are outputted as teacher data;

switching the operation mode from the second surveillance mode to the first surveillance mode in response to the target object moving from the second region to the first region;

generating a trained model by performing machine learning using the teacher data; and in the first surveillance mode, detecting and tracking the target object using the generated trained model.

5. A non-transitory computer-readable storage medium storing a program for causing a computer to execute a process comprising:

allowing switching an operation mode of a surveillance camera between a first surveillance mode in which a target object present in a surveillance region is detected and tracked, and a second surveillance mode in which the target object is imaged according to a manual operation performed with respect to the surveillance camera;

dividing the surveillance region into a first region and a second region;

switching the operation mode from the first surveillance mode to the second surveillance mode and causes the surveillance camera to perform a zoom to enlarge a region including the target object according to a fact that the target object tracked in the first surveillance mode in the first region enters the second region, wherein, in the second surveillance mode, the surveillance camera is caused to perform at least any one of a pan, a tilt, or the zoom according to the manual operation, and an image captured by the surveillance camera after the manual operation and a history of the manual operation are outputted as teacher data;

switching the operation mode from the second surveillance mode to the first surveillance mode in response to the target object moving from the second region to the first region;

generating a trained model by performing machine learning using the teacher data; and in the first surveillance mode, detecting and tracking the target object using the generated trained model.

* * * * *